UNITED STATES PATENT OFFICE.

CHARLES HENRY STEARN, OF LONDON, ENGLAND.

PROCESS OF MANUFACTURING FILAMENTS FROM CELLULOSE.

SPECIFICATION forming part of Letters Patent No. 716,778, dated December 23, 1902.

Application filed April 3, 1902. Serial No. 101,269. (No specimens.)

*To all whom it may concern:*

Be it known that I, CHARLES HENRY STEARN, a subject of the King of Great Britain and Ireland, residing at No. 47 Victoria street, Westminster, London, England, have invented certain new and useful Improvements in the Process of Manufacturing Filaments from Cellulose, whereof the following is a specification.

My invention relates to the treatment of the cellulose compounds known under the name of "viscose" and certain derivatives thereof, a typical illustration of such material being disclosed in Letters Patent of the United States No. 520,770, dated June 5, 1894, granted to C. F. Cross, E. J. Bevan, and C. Beadle.

The purpose of the present invention is to produce and treat such cellulose compounds with special reference to the formation of filaments therefrom in the manufacture of what is commercially termed "artificial silk," the desiderata being to prepare the material in the best physical condition for the initial formation of a filament and thereafter completing the treatment in such manner as to obtain an ultimate product of the proper character.

Viscose may be broadly described as the double xanthate of cellulose and an alkali, being preferably obtained by the treatment of cellulose with a solution of caustic soda and carbon bisulfid. The process of manufacture admits of variation, and the resultant products, though having the same general character, may vary in accordance with the treatment. One of the characteristics, however, which I believe to be common to them all, is a tendency to pass by progressive decomposition through various well-defined stages. I have ascertained that this "instability" (if it may be so called) is of such definite character that it may be utilized in a manner highly advantageous for the manufacture of the particular product now under contemplation and that by a properly-organized treatment based upon the progressive decomposition most satisfactory results can be uniformly obtained.

I will now proceed to give a typical description of my process, with the understanding, however, that the proportions stated are not intended to be restrictive, but are those which have yielded the best results, so far as my experience has extended.

I take one hundred pounds of cellulose (preferably in the form of white wood-pulp) and cover this with an aqueous solution of caustic soda containing, preferably, 17.7 per cent. of caustic. The pulp is soaked in this solution for about twenty-four hours, after which the excess of solution is removed by pressure until the moistened stock is found to weigh about three times as much as it did in its original dry state. This product is stored in closed vessels for about forty-eight hours to permit the permeation of the cellulose by the alkaline solution. It is then placed in a closed vessel with seventy-five pounds of bisulfid of carbon and agitated, preferably by rotation, until the reaction is found to be complete, the usual time required being about five hours. It is then exposed to the air for a short time to allow the excess of bisulfid of carbon to evaporate. A caustic-soda solution consisting of three hundred pounds of water and fifty-four pounds of caustic soda is then added and the mass is preferably stirred until a homogeneous solution is obtained. The product thus formed consists of the double xanthate of cellulose and soda in solution with an excess of free caustic soda present. The viscose thus primarily formed is readily soluble (without decomposition) in water, brine, caustic-soda solution, or weak acids, such as acetic or lactic acids. By lapse of time, however, the primary viscose compound splits up progressively, the actual amount of combined cellulose remaining substantially constant, while the ingredients derived directly from the carbon bisulfid and the caustic soda tend to separate and form individual combinations chemically dissociated from the cellulose itself. Thus if the formula of cellulose be taken as $C_6H_{10}O_5$, the reaction by which the xanthate is formed consists in replacing one molecule of H by $CS_2Na$, and the primary viscose product may therefore be expressed as $C_6H_9O_5\text{-}CS_2Na$. The effect of time upon this solution is to form successively a series of cellulose compounds, which may be expressed as $C_{12}H_{19}O_{10}CS_2Na$, $C_{18}H_{29}O_{15}CS_2Na$, $C_{24}H_{39}O_{20}\text{-}CS_2Na$, &c., the total of combined cellulose substantially persisting, while the proportions of the other ingredients in combination therewith progressively diminishing. With such decomposition the solubility of the cellulose compound is modified. Thus in what may be called the "second" stage the compound is soluble in water, caustic soda, and weak acids, but brine converts it into a gelatinous mass. In what may be termed the "fourth" stage ($C_{24}H_{39}O_{20}CS_2Na$) it is substantially insoluble in water and in the acids above named, but remains soluble in a caustic-soda solution of proper strength. By the neutralization of this excess of caustic soda the material can be readily precipitated in a gelatinous mass. This precipitating action may be conveniently termed "gelatinization," and need not be accompanied by the complete dissociation of the cellulose from its combination as the immediate result of the changed physical condition, as some of the xanthate may still remain in the mass.

I take advantage of the conditions thus afforded to obtain the material in the most desirable condition for the formation of filaments and their subsequent completion as finished thread and to that end proceed as follows: The primary product of the process just described—i. e., viscose maintained in solution in the presence of an excess of caustic soda—is stored in closed vessels to permit its progressive decomposition under control. The rate of decomposition depends upon both time and temperature, it being generally true that with higher temperature a shorter time will be required to attain any given stage; but as other and undesirable results might follow from an exposure to an excessively-high temperature it is expedient to maintain what may be termed "normal" conditions at a temperature of, say, 60° Fahrenheit. Under these circumstances after about seven days of aging the decomposition will have progressed until the resulting compound has attained substantially the fourth stage above designated, ($C_{24}H_{39}O_{20}CS_2Na$,) the viscose still remaining in dissolved form in a solution containing an excess of caustic soda uncombined with the cellulose itself. I have found that in substantially this stage the viscose is in the most desirable condition for the formation of filaments, since it passes into a gelatinous condition with great readiness by the use of a comparatively mild precipitating solution, which does not injuriously affect the tenacity or other characteristics of the filament. The precipitation or gelatinization is effected by neutralizing the caustic-soda solution which has enabled the viscose to be maintained in a dissolved condition, and the most desirable precipitating agent known to me is a solution of sulfate of ammonia, though of course other neutralizing reagents which do not injuriously affect the viscose may be employed.

As the present application does not directly relate to the apparatus or mechanical process employed for forming and spinning the filament, it is only necessary to state incidentally that the viscose solution is projected in the usual manner through one or more orifices into the setting solution and then subjected to such further mechanical treatment as is necessary to produce thread of the desired dimensions.

One peculiar advantage of the preliminary treatment just described is that the precipitating action may be quickly effected to the extent necessary for the formation of a filament without requiring the actual decomposition of the xanthate itself, whereby such decomposition and the consequent conversion of the material into its ultimate form may be deferred until a later stage, if desired. It will be noted also that the ultimate viscose solution obtained by decomposition to the desired extent may be diluted to any degree of consistency by the addition of a further quantity of caustic-soda solution, and in this way the "spinning solution," as it may be termed, may be adapted for use in connection with orifices of any desired size. I have found that for normal conditions of temperature, &c., it is expedient to thus dilute the spinning solution until the combined cellulose therein constitutes about six per cent. of the total amount, the dilution being effected by adding a solution of caustic soda containing about eight per cent. of the alkali. After the filament has been formed in its gelatinized condition and, as is generally the case, united with others into a composite strand the decomposition of the viscose is effected, preferably, by the action of heat, which may be conveniently accomplished by exposure for about one hour to steam at a temperature of about 212° Fahrenheit. The thread may then be washed in water and dried under strain, if a luster is desired, or may be dyed or otherwise treated.

By reference to the foregoing specification it will be seen that my invention relates to the preparation of the solution for spinning and to the treatment of the spun filament itself. Thus the advantages consist, primarily, in so conducting the progressive decomposition of the initial viscose as to permit changes to the desired extent, while still insuring the obtaining of the aged compound in dissolved form. They further consist in selecting that stage of the decomposition which is best adapted for the initial formation of a filament by the action of a desirable setting solution. They further consist in so conducting the setting operation as to obtain the material in the proper "gelatinized" condition for spinning without necessitating the immediate and complete conversion of the viscose into its ultimate condition, and they further consist in properly effecting the conversion or decomposition of the viscose after the material has undergone the mechanical processes incident to the spinning.

I have endeavored in the foregoing specification to express with sufficient accuracy for practical purposes the nature of the progressive changes by which the viscose is obtained in the desired condition for spinning, but it will be obvious that the statements thus made are not minutely restrictive. I believe it to be the fact that by the aging process above described when permitted to take place in the presence of a reagent capable of maintaining the product in solution better conditions for spinning are successively attained down to about the stage above mentioned as the most desirable, and that thereafter the viscose in a certain sense deteriorates for spinning purposes; but I do not mean to restrict my broader claim to the exact conditions thus defined. A substantial predominance of the cellulose ingredient remaining in combination in the viscose compound over and above its original proportions in said compound is manifested by substantial insolubility in water alone, and in expressing the condition of the material by reference to the predominance of the cellulose ingredient I mean that at least such degree of predominance shall have been attained. Furthermore, I desire to separately claim the several features as individually valuable improvements, as well as to claim their conjoint or cumulative employment, which constitutes what I believe to be the best process as an entirety.

Having thus described my invention, I claim—

1. The herein-described process of preparing viscose for manufacture into filaments; which consists in forming an initial viscose compound in solution; aging the same to obtain substantial predominance of the cellulose ingredient remaining in combination; and obtaining the aged compound in dissolved form, by means of an alkaline solution.

2. The herein-described process of preparing viscose for manufacture into filaments; which consists in forming an initial viscose compound in solution; aging the same until the ratio of the cellulose ingredient remaining in combination is about four times its original proportion; and obtaining the aged compound in dissolved form, by means of an alkaline solution.

3. The herein-described process of manufacturing filaments from viscose, which consists in gelatinizing the viscose compound by means of a setting solution, to the degree required for spinning, and thereafter effecting the decomposition of the viscose when in a filamentary form.

4. The herein-described process of manufacturing filaments from viscose, which consists in forming an initial viscose compound in solution; aging the same to obtain substantial predominance of the cellulose ingredient remaining in combination; obtaining the aged compound in dissolved form by means of an alkaline solution; discharging the aged compound, in filamentary form, into a setting solution and thereby gelatinizing the viscose to the degree required for spinning; and effecting the decomposition of the viscose, after the filament is spun.

In testimony whereof I, the said CHARLES HENRY STEARN, have signed this specification in the presence of two subscribing witnesses.

CHARLES HENRY STEARN.

Witnesses:
WILLIAM JOHN WEEKS,
FRED GOATER.